(12) United States Patent
Lin et al.

(10) Patent No.: US 10,866,920 B2
(45) Date of Patent: Dec. 15, 2020

(54) METHOD AND DEVICE FOR ADJUSTING SIGNAL TRANSMISSION DIRECTION IN BIDIRECTIONAL REDRIVER IC CHIP

(71) Applicant: VIA LABS, INC., New Taipei (TW)

(72) Inventors: Yu-Lung Lin, New Taipei (TW); Hsuan-Jui Chang, New Taipei (TW)

(73) Assignee: VIA LABS, INC., New Taipei (TW)

( * ) Notice: Subject to any disclaimer, the term of this patent is extended or adjusted under 35 U.S.C. 154(b) by 5 days.

(21) Appl. No.: 16/503,700

(22) Filed: Jul. 5, 2019

(65) Prior Publication Data

US 2020/0012614 A1 Jan. 9, 2020

Related U.S. Application Data

(60) Provisional application No. 62/694,037, filed on Jul. 5, 2018.

(30) Foreign Application Priority Data

Jun. 14, 2019 (TW) .............................. 108120752 A

(51) Int. Cl.
*G06F 13/42* (2006.01)
*H04L 5/16* (2006.01)
*H04B 3/20* (2006.01)
*G06F 13/40* (2006.01)
*H04B 7/155* (2006.01)
*H04L 29/06* (2006.01)

(52) U.S. Cl.
CPC ...... *G06F 13/4282* (2013.01); *G06F 13/4004* (2013.01); *H04B 3/20* (2013.01); *H04L 5/16* (2013.01); *G06F 2213/0042* (2013.01)

(58) Field of Classification Search
CPC .... G06F 13/4282; G06F 13/36; G06F 13/385; G06F 13/4022
See application file for complete search history.

(56) References Cited

U.S. PATENT DOCUMENTS

| | | | |
|---|---|---|---|
| 8,571,130 B2 * | 10/2013 | Yamaguchi | H04B 7/06 370/242 |
| 2010/0188127 A1 * | 7/2010 | Cheng | H03L 7/0812 327/237 |
| 2011/0250854 A1 * | 10/2011 | Hamparian | H03F 1/34 455/101 |
| 2016/0147704 A1 * | 5/2016 | Guillerm | G06F 13/4068 710/106 |
| 2018/0032460 A1 * | 2/2018 | Chuang | G06F 13/385 |
| 2018/0143934 A1 * | 5/2018 | Li | H04L 12/10 |

* cited by examiner

*Primary Examiner* — Getente A Yimer
(74) *Attorney, Agent, or Firm* — WPAT, PC

(57) ABSTRACT

For adjusting a signal transmission direction in a cable, which is configured to be electrically coupled between a first interface port and a second interface port, an electric characteristic on at least a first pin of the first interface port is detected. Then a signal transmission direction of at least one pair of differential signal transmission channels in the cable is controlled to change from a first direction to a second direction different from the first direction, provided that a communication protocol between the first interface port and the second interface port is changed from a first communication protocol to a second communication protocol, and the electric characteristic complies with a first condition.

15 Claims, 11 Drawing Sheets

| USB Type-C Plug #1 | | Wire | | USB Type-C Plug #2 | |
|---|---|---|---|---|---|
| Pin | Signal Name | Wire Number | Signal Name | Pin | Signal Name |
| A1, B1, A12, B12 | GND | 1 [16] | GND_PWRrt1 [GND_PWRrt2] | A1, B1, A12, B12 | GND |
| A4, B4, A9, B9 | VBUS | 2 [17] | PWR_VBUS1 [PWR_VBUS2] | A4, B4, A9, B9 | VBUS |
| A5 | CC | 3 | CC | A5 | CC |
| B5 | VCONN | 18 | PWR_VCONN | B5 | VCONN |
| A6 | Dp1 | 4 | UTP_Dp | A6 | Dp1 |
| A7 | Dn1 | 5 | UTP_Dn | A7 | Dn1 |
| A2 | SSTXp1 | 6 | SDPp1 | B11 | SSRXp1 |
| A3 | SSTXn1 | 7 | SDPn1 | B10 | SSRXn1 |
| B11 | SSRXp1 | 8 | SDPp2 | A2 | SSTXp1 |
| B10 | SSRXn1 | 9 | SDPn2 | A3 | SSTXn1 |
| B2 | SSTXp2 | 10 | SDPp3 | A11 | SSRXp2 |
| B3 | SSTXn2 | 11 | SDPn3 | A10 | SSRXn2 |
| A11 | SSRXp2 | 12 | SDPp4 | B2 | SSTXp2 |
| A10 | SSRXn2 | 13 | SDPn4 | B3 | SSTXn2 |
| A8 | SBU1 | 14 | SBU_A | B8 | SBU2 |
| B8 | SBU2 | 15 | SBU_B | A8 | SBU1 |
| Shell | Shield | Outer Shield | Shield | Shell | Shield |

FIG. 4

METHOD AND DEVICE FOR ADJUSTING SIGNAL TRANSMISSION DIRECTION IN BIDIRECTIONAL REDRIVER IC CHIP

CROSS-REFERENCE TO RELATED APPLICATIONS

The present application is a nonprovisional application claiming benefit from a prior-filed provisional application bearing a Ser. No. 62/694,037 and filed Jul. 5, 2018, the entity of which is incorporated herein for reference.

FIELD OF THE INVENTION

The present invention relates to method and device for adjusting a signal transmission direction, and more particularly to method and device for adjusting a signal transmission direction in a bidirectional signal repeater IC chip.

BACKGROUND OF THE INVENTION

The Universal Serial Bus (USB) is the most widely used signal cable standard for electronic devices nowadays, and the USB Type-C is the latest version, so far, of the widely used interface standards. The physical appearance of the USB Type-C is as schematically shown in FIG. 1. The plug connector structure 11 at one end of the cable 10 has the same number of pins. i.e. 12, and configuration in the upper layer 111 and the lower layer 112. Compared to previous generations of USB configurations, with this design, a user does not have to specifically identify the orientation of a plug connector for connection to a corresponding receptacle connector since both the upper and lower layers 111 and 112 of the plug connector are identical, and two sets of data lines D+/D− are simultaneously contained in the receptacle connector as a combination. In other words, the USB Type-C plug connector and receptacle connector can be used bi-directionally.

In addition, the USB Type-C standard introduces dual-role capability. Since the plug connectors at both ends of the USB Type-C cable are identical, it is necessary for two devices coupled at the both ends of the USB Type-C cable communicate with each other to determine their roles as a host or a device. The communication needs to be carried out upon coupling to the cable to determine the roles based on data and power conditions. A host port that is coupled to the host for data communication is defined as a Downstream Facing Port (DFP), and a device port that is coupled to the device is defined as an Upstream Facing Port (UFP). Furthermore, a power supply terminal is defined as a source, and a power consumption terminal is defined as a sink. Some devices can have Dual Roles of Data (DRD) capabilities and Dual Roles of Power (DRP) capabilities. By using the Configuration Channel wire (referred to as the wire CC) for communication, the role of the power source can be defined during the connection of the two devices.

The USB Type-C is currently available for transmission of signals conforming to the USB 3.2 Enhanced SuperSpeed protocol. The USB 3.2 indicates Gen X×Y, where X stands for signal transmission rate (Speed) and Y stands for differential signal transmission channel number (Lanes), such as Enhanced SuperSpeed Gen 1×1, Enhanced SuperSpeed Gen 2×1, Enhanced SuperSpeed Gen 1×2, Enhanced SuperSpeed Gen 2×2, etc. Gen 1 represents a transmission rate of 5 Gbps in each pair of differential signal transmission channels, and Gen 2 represents a transmission rate of 10 Gbps in each pair of differential signal transmission channels, and so on. Therefore, Enhanced SuperSpeed Gen 2×1 represents two pairs of differential signal transmission channels between the host and the device. One pair of differential signal transmission channels TX is used to transmit signals TX+/TX− from the host to the device, and the other pair of differential signal receiving channels RX are used to receive signals RX+/RX− from the device to the host, wherein the transmission rate on each pair of differential signal transmission channels is 10 Gbps. The Enhanced SuperSpeed Gen 2×2 represents four pairs of differential signal transmission channels between the host and the device. Two pairs of differential signal transmission channels TX are used to transmit signals TX+/TX− from the host to the device, and the other two pairs of differential signal receiving channels RX are used to receive signals RX+/RX− from the device to the host, wherein the transmission rate on each pair of differential signal transmission channels is 10 Gbps.

In order to expand the application range of the USB Type-C, it is further stipulated in the specification that it can be used to transmit signals conforming to the DisplayPort protocol, wherein the DisplayPort RBR signal transmission rate is 1.62 Gbps, the DisplayPort HBR signal transmission rate is 2.7 Gbps, the DisplayPort HBR2 signal transmission rate is 5.4 Gbps, and the DisplayPort HBR3 signal transmission rate is 8.1 Gbps. It can be clearly seen from the data, i.e. the signal transmission rate, that the USB Type-C supports the signal transmission rate up to more than 5 Gbps. However, when the signal transmission rate is getting higher, the signal attenuation caused by the transmission distance becomes more and more serious, so the length of the USB Type-C cable is limited.

Informative practical cable lengths corresponding to different specifications are clearly listed in the official specification version 1.3 of USB Type-C. For example, the recommended informative practical cable length for USB 3.1 Gen2 is less than or equal to 1 meter. Unfortunately, one meter is too short in practical applications. Therefore, a signal repeater (ReDriver) is generally installed in the cable to amplify signals. Such a cable having a signal amplification function is so called as an active cable, and the length of the cable provided with a signal repeater can be significantly increased.

However, once a signal repeater (ReDriver) is integrated into a USB Type-C cable, directivity would become an issue. For example, when the USB Type-C active cable is configured for image transmission in DisplayPort, the two connectors of the conventional active cable at both ends thereof must be specifically coupled to the image signal source and the video playback device, respectively, and cannot be used in reverse.

SUMMARY OF THE INVENTION

Therefore, the present invention aims to solve the problems encountered in the prior art by automatically detecting the host side and the device side and automatically configuring the cable.

In an aspect of the present invention, a method for adjusting a signal transmission direction is adapted to be use in a cable configured to be electrically coupled between a first interface port and a second interface port. The method includes: detecting an electric characteristic on at least a first pin of the first interface port; and controlling a signal transmission direction of at least one pair of differential signal transmission channels in the cable to change from a first direction to a second direction different from the first direction, provided that a communication protocol between the first interface port and the second interface port is changed from a first communication protocol to a second communication protocol, and the electric characteristic complies with a first condition.

In another aspect of the present invention, a device for adjusting a signal transmission direction is adapted to be used in a cable configured to be electrically coupled between a first interface port and a second interface port. The device includes: a first bidirectional amplifier disposed in the cable near the first interface port, and electrically coupled to a first pin of the first interface port; and a first sensor disposed in the cable near the first interface port, and electrically coupled to a second pin of the first interface port. A signal transmission direction of the first bidirectional amplifier is changed provided that a communication protocol between the first interface port and the second interface port is changed from a first communication protocol to a second communication protocol, and a first electric characteristic detected by the first sensor on the second pin complies with a first condition.

A further aspect of the present invention relates to a bidirectional ReDriver IC chip for use in a cable configured to be electrically coupled between a first interface port and a second interface port. The bidirectional ReDriver IC chip is disposed in the cable near the first interface port, and includes a bidirectional amplifier electrically coupled to a first pin of the first interface port; and a sensor electrically coupled to a second pin of the first interface port. A signal transmission direction of the bidirectional amplifier is changed from a first direction to a second direction different from the first direction, provided that a communication protocol between the first interface port and the second interface port is changed from a first communication protocol to a second communication protocol, and an electric characteristic detected by the sensor on the second pin complies with a first condition.

BRIEF DESCRIPTION OF THE DRAWINGS

The above contents of the present invention will become more readily apparent to those ordinarily skilled in the art after reviewing the following detailed description and accompanying drawings, in which:

FIG. 4 is a schematic diagram illustrating wiring contents of a USB Type-C standard cable assembly according to an embodiment of the present invention;

DETAILED DESCRIPTION OF THE PREFERRED EMBODIMENT

Figure 1:
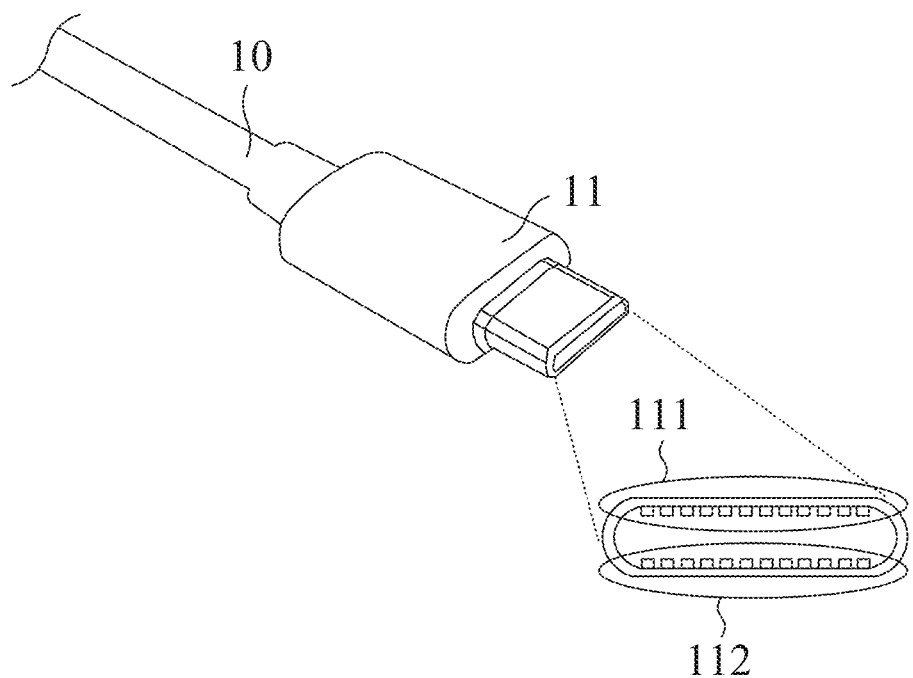
FIG. 1 is a schematic diagram illustrating a typical plug connector of a USB Type-C cable.

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

In order to enable the USB Type-C cable integrated with the signal repeater (ReDriver) to still have the feature of bi-directional installation, a method and a device for adjusting signal transmission direction are developed according to the present invention by providing a bidirectional signal ReDriver integrated circuit chip. Throughout the specification, a pair of differential signals are referred to as a pair of differential signal transmission channels (one lane). For example, in the setting under USB 3.2 Gen 1×2 protocol or USB 3.2 Gen2×2 protocol, there are four pairs of differential signal transmission channels (four lanes) between the host and the device, wherein two pairs of differential signal transmission channels TX are used to transmit the signal TX+/TX− from the host to the device, and the other two pairs of differential signal receiving channels RX are used to receive the signal RX+/RX− from the device to the host. In addition, in the DisplayPort communication protocol compatible with USB Type-C, there may be a pair, two pairs or four pairs of differential signal transmission channels from the host to the device to transmit the DisplayPort protocol. According to the DisplayPort protocol, the transmission direction must be from the host to the device. The one that uses one or two pairs of differential signal transmission channels between the host and the device to transmit the DisplayPort protocol and two pairs of differential signal transmission channels to transmit USB3.2 Gen1×1 or USB3.2 Gen2×1 protocol is so called as a multi-function communication protocol. On the other hand, the one that uses four pairs of differential signal transmission channels between the host and the device to transmit the DisplayPort protocol is so called as a DisplayPort (4-lane) protocol. That is, when the protocol changes from USB 3.2 to the DisplayPort (4-lane) protocol, there will be two pairs of differential signal transmission channels reversed. For example, in the setting of USB 3.2 Gen1×2 protocol or the USB 3.2 Gen2×2 protocol, the direction of the two pairs of differential signal receiving channels RX will be changed to the direction of the differential signal transmission channel TX, i.e. transmitting signals from the host to the device. When the protocol is changed from USB 3.2 to the multi-function signal transmission protocol, there will be a pair of differential signal transmission channels that need to be reversed. For example, in the setting of USB 3.2 Gen1×2 protocol or USB 3.2 Gen2×2 protocol, the direction of the pair of differential signal receiving channels RX will be changed to the direction of the differential signal transmission channel TX, i.e. transmitting signals from the host to the device. A signal repeater (ReDriver) developed according to the present invention is capable of realizing the direction of each pair of channels and switching correctly. In addition, a signal repeater may be provided at each end of the active cable. Since the cable is configured to couple the TX transmission channel at the host side to the RX transmission channel at the device side and the both signal repeaters are fixed to couple to corresponding connectors, the directionality feature of the signal repeater at the host side should be contrary to the directionality feature of the signal repeater at the device side. Therefore, according to the present invention, a signal repeater is enabled to determine which one of the host and the device it is coupled to so that the signal repeater can in turn switch the transmission into the correct direction for each pair of channels. In another embodiment, the active cable may also be provided with only one signal repeater, and the operation mode is similar, which will be described in detail hereinafter.

Figure 2:
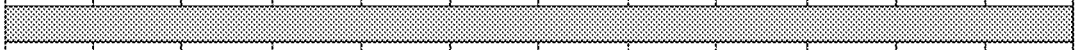
FIG. 2 is a schematic diagram illustrating pins of a receptacle connector according to an embodiment of the present invention.
Figure 3:
FIG. 3 is a schematic diagram illustrating pins of a plug connector according to an embodiment of the present invention.

Please refer to FIGS. 2-4, wherein FIG. 2 depicts distribution of the USB Type-C receptacle connector pins, FIG. 3 depicts distribution of the USB Type-C plug connector pins, and FIG. 4 depicts the contents of the USB Type-C standard cable assembly wiring. As shown, Pin A8 (SBU1) of the first USB Type-C plug connector (USB Type-C plug #1) is coupled to Pin B8 (SBU2) of the second USB Type-C plug connector (US Type-C plug #2) via a wire. On the other hand, Pin A8 (SBU1) of the second USB Type-C plug connector (USB Type-C plug #2) is coupled to Pin B8 (SBU2) of the first USB Type-C plug connector (US Type-C plug #1) via a wire.

The first USB Type-C plug connector and the second USB Type-C plug connector of the USB Type-C standard cable as mentioned above can be respectively inserted into the first USB Type-C receptacle connector and the second USB Type-C receptacle connector. When the communication protocol between the first USB Type-C receptacle connector and the second USB Type-C receptacle connector is changed from the USB Type-C communication protocol to the DisplayPort communication protocol, which is also referred to as a DisplayPort Alt Mode, a single USB Type-C cable can transmit both the DisplayPort signal and the USB signal without any additional adapter. If it is not necessary to use 4 lanes for DisplayPort signal transmission, e.g. in a case of multi-function signal transmission communication protocol, the remaining lanes can be used for USB 3.2 Gen1×1 or USB3.2 Gen2×1 signal transmission, while transmitting power.

In the DisplayPort Alt Mode, the DFP in the USB standard is revised into DFP_D (Downstream Facing Port in DisplayPort), which indicates the downstream-facing port defined in the DisplayPort v1.3 specification. It is usually associated with a DisplayPort signal source device, e.g. a computer, or with a DisplayPort Branch device. As for the UFP in the USB standard, it is revised into UFP_D (Upstream Facing Port in DisplayPort), which indicates the upstream-facing port defined in the DisplayPort v1.3 specification. UFP_D is usually associated with a DisplayPort signal receiving device, e.g. a screen, and may also be associated with a DisplayPort Branch device. In addition, DP_BR (DisplayPort Bit Rate) indicates an electronic signal bit rate defined in the DP v1.3 specification, which can be one of four transmission speeds, i.e. RBR, HBR, HBR2 or HBR3.

Figure 5:
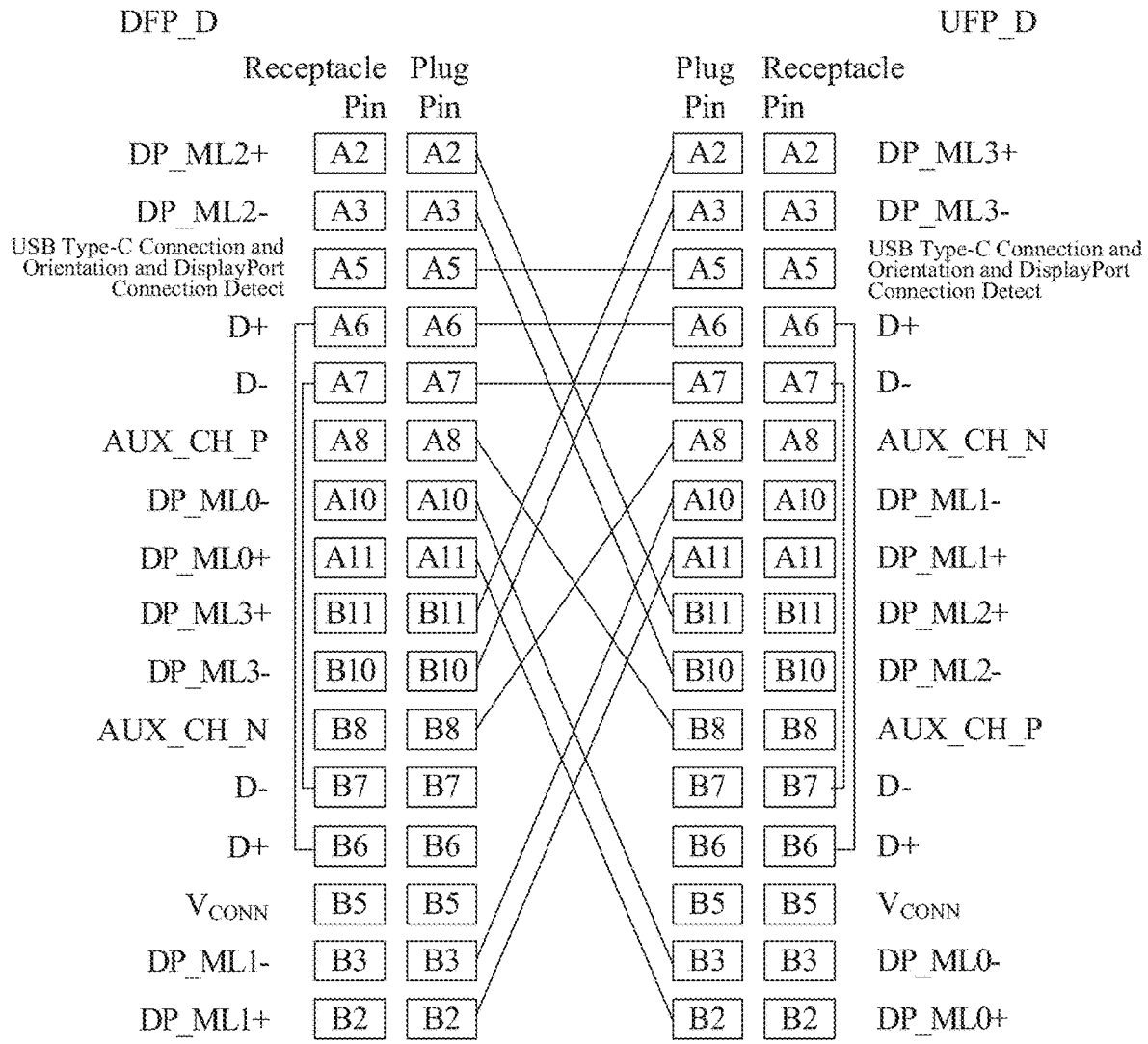
FIG. 5 is a schematic diagram illustrating DisplayPort pins in USB Type-C when the plugs of the DFP_D and the UFP_D cable are in normal directions.
Figure 6:
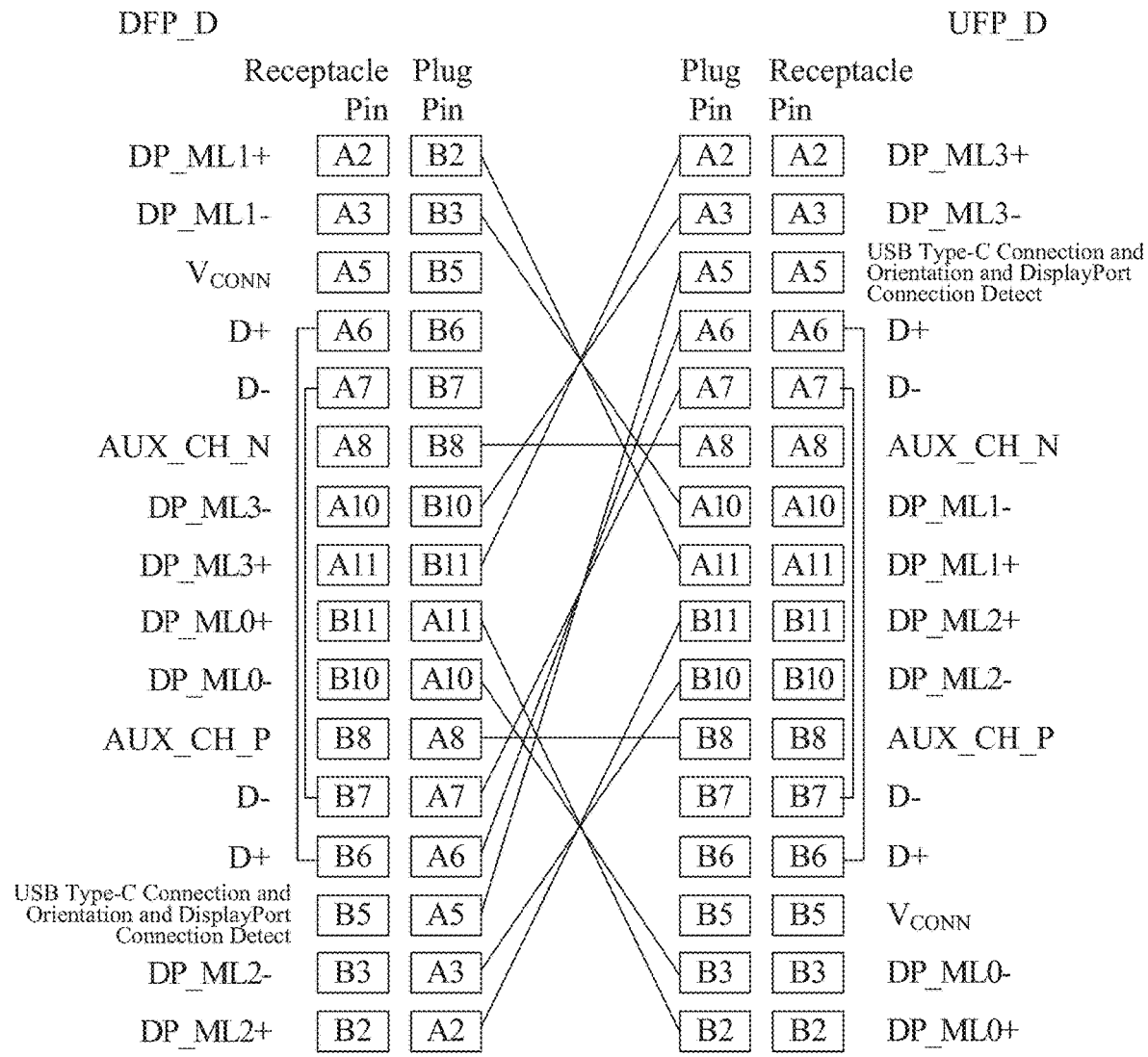
FIG. 6 is a schematic diagram illustrating DisplayPort pins in USB Type-C when the plug of the DFP_D cable is inverted.
Figure 7:
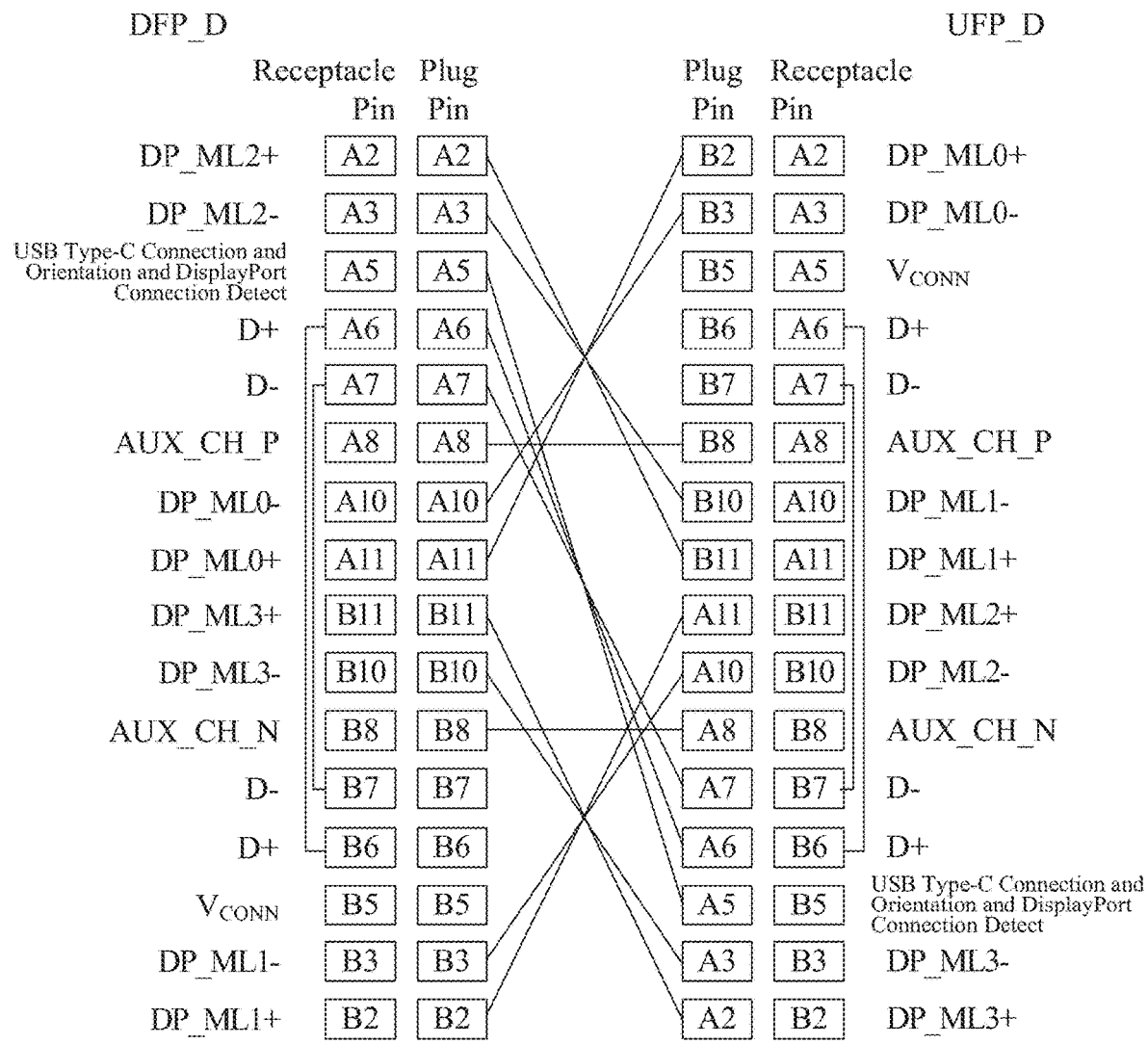
FIG. 7 is a schematic diagram illustrating DisplayPort pins in USB Type-C when the plug of the UFP_D cable is inverted.
Figure 8:
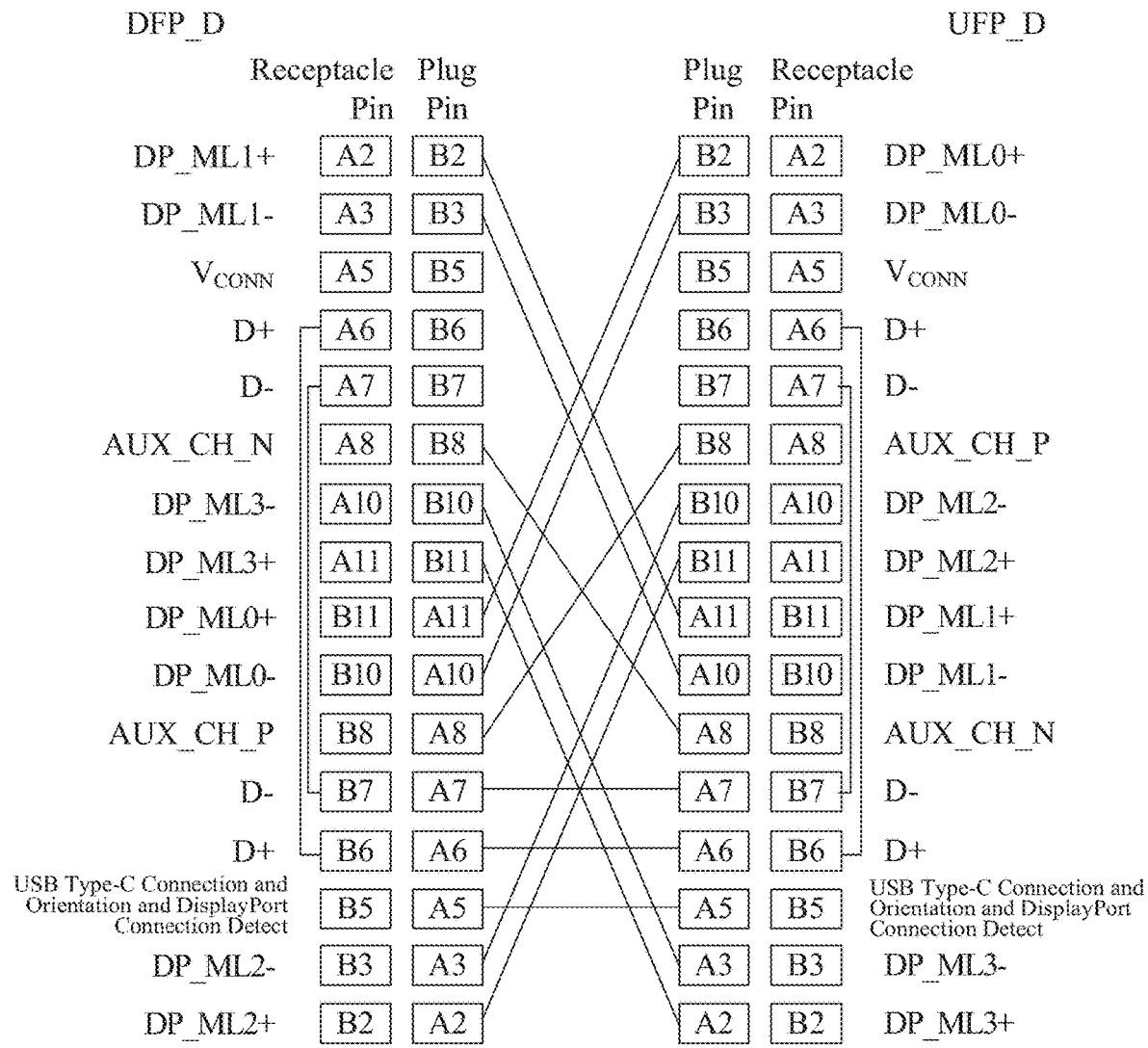
FIG. 8 is a schematic diagram illustrating DisplayPort pins in USB Type-C when the plugs of both the DFP_D cable and the UFP_D cable are inverted.

Please refer to FIGS. 5-8, which show technical data of the signal pin connections in the cable taken from the DisplayPort Alt Mode on USB Type-C v1.0a specification when switching to the DisplayPort Alt Mode. FIG. 5 depicts the DisplayPort pins on the USB Type-C configured when the cable plugs of the DFP_D and UFP_D are in the normal cable plug orientation. FIG. 6 depicts the DisplayPort pins on the USB Type-C configured when the cable plug orientation of the DFP_D is inverted (upside down). FIG. 7 depicts the DisplayPort pins on the USB Type-C configured when the cable plug orientation of the UFP_D is inverted (upside down). FIG. 8 depicts the DisplayPort pins on the USB Type-C configured when the cable plug orientation of both the DFP_D and UFP_D are inverted (upside down).

It can be seen from the above drawings and descriptions that the A8 pin of the plug of the cable coupled to the DFP_D, i.e. the source of the DisplayPort, is always coupled to the AUX_CH_P pin of the receptacle of the DFP_D regardless of the orientation of the cable. At the same time, regardless of the orientation of the cable, the B8 pin of the cable plug of the DFP_D is always coupled to the AUX_CH_N pin of the receptacle of the DFP_D. In addition, regardless of the cable orientation, the A8 pin of the cable plug of the UFP_D is always coupled to the AUX_CH_N pin of the receptacle of the UFP_D. Furthermore, regardless of the cable orientation, the B8 pin of the cable plug of the UFP_D is always coupled to the AUX_CH_P pin of the receptacle of the UFP_D.

Figure 9:
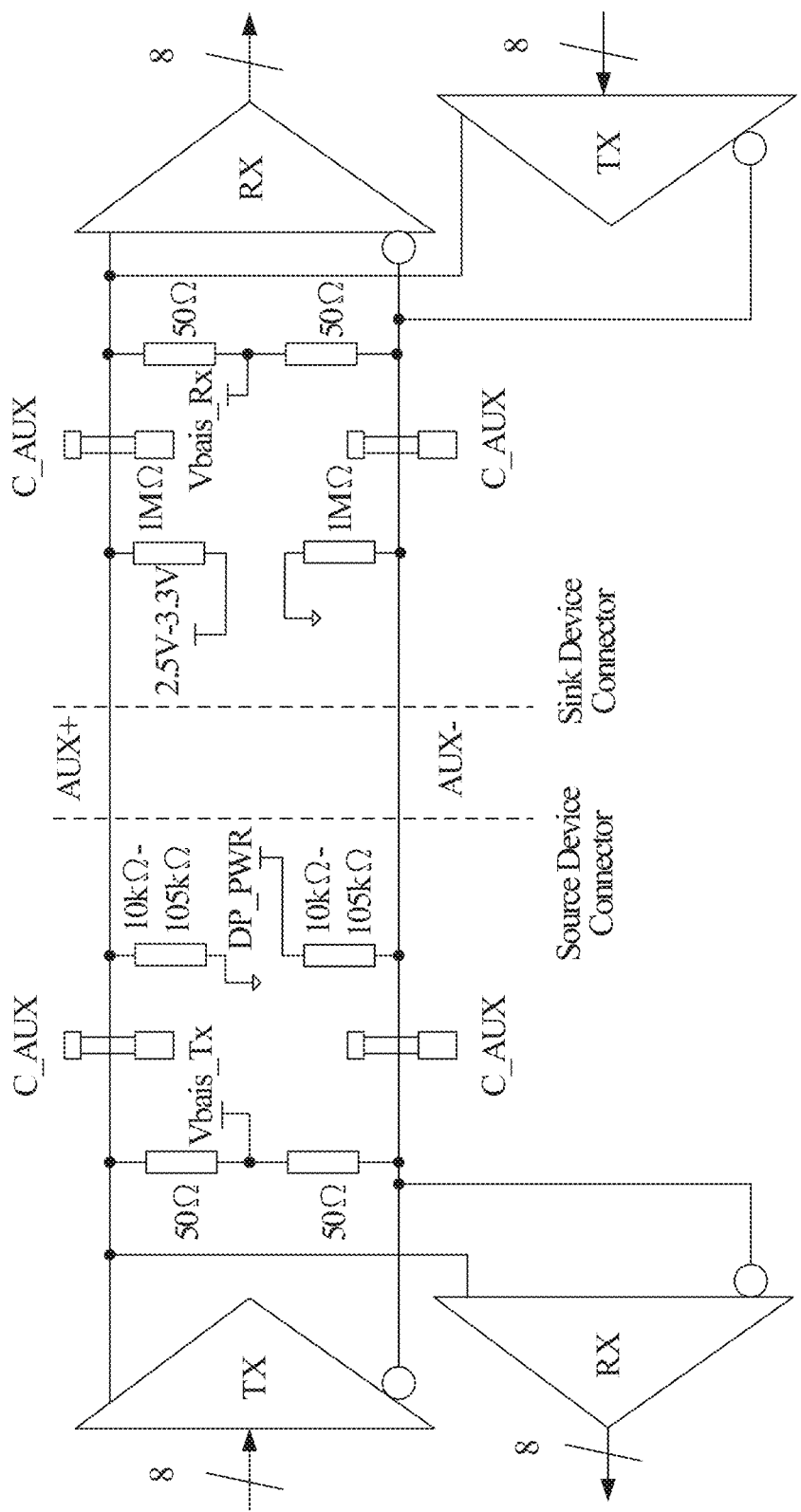
FIG. 9 is a circuit block diagram illustrating an AUX CH differential signal pair defined in the DisplayPort v1.4 specification.

Next, please refer to FIG. 9, which is a circuit block diagram illustrating an AUX CH differential signal pair defined in the DisplayPort v1.4 specification. The voltage level of the power supply voltage and the resistance level of the voltage-dividing resistor in this figure can be used to derive the voltage range on AUX_CH_P and AUX_CH_N. The voltage range on AUX_CH_P is from about 1% to 10% of 2.5V~3.3V, which is estimated to be from 0.024752475V to 0.313574661V. The voltage ranges on AUX_CH_N is from about 90% to 99% of DP_PWR. According to the DisplayPort v1.4 specification, the DP_PWR range on DFP_D is 2.89V~3.6V, wherein the standard value is 3.3V. Therefore, after conversion, the voltage range on AUX_CH_N is 2.615384615V~3.564356436V.

After figuring out the voltage ranges of AUX_CH_P and AUX_CH_N, the signal repeater in the active cable determines the location it is, either at the host (DFP_D) or at the device (UFP_D), according to the voltage information of the AUX_CH_P and AUX_CH_N. Once the signal repeater can identify the transmission direction in each lane, each pair of channels can be switched to a correct transmission direction.

Figure 10:
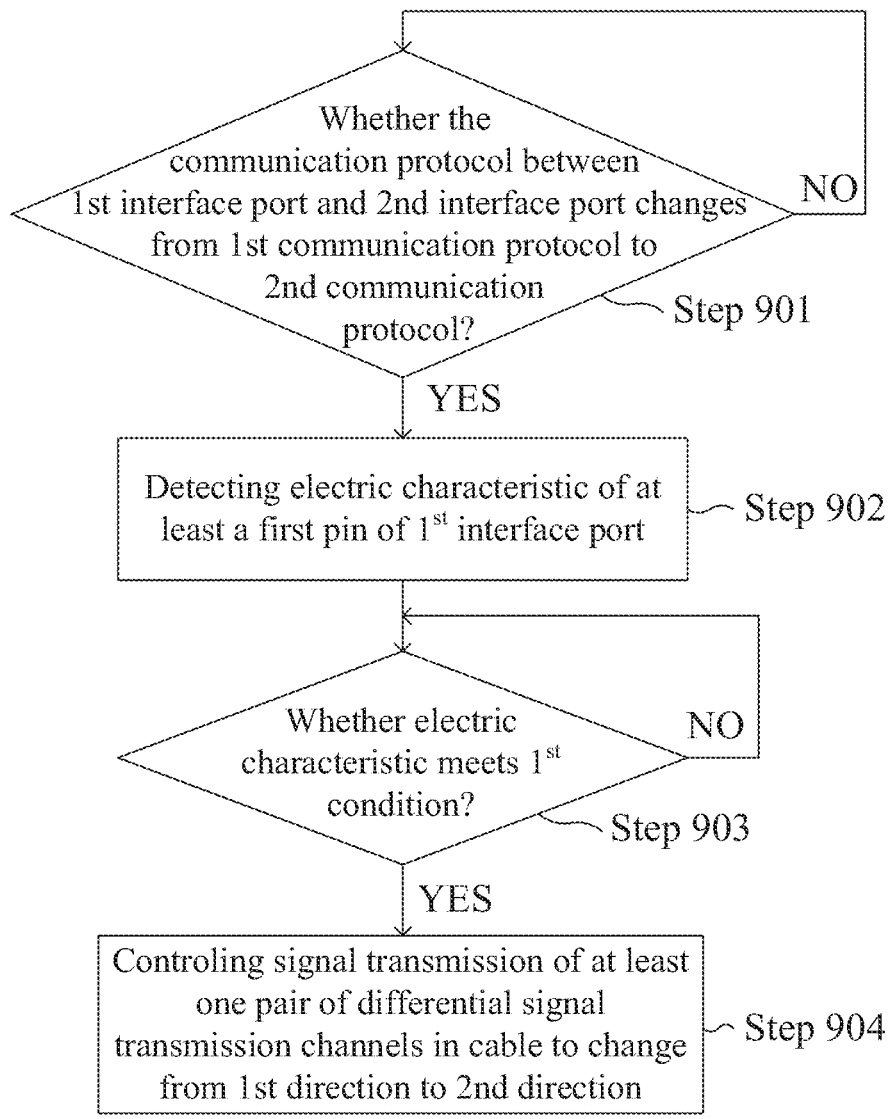
FIG. 10 is a flowchart schematically illustrating a method for adjusting a signal transmission direction according to an embodiment of the present invention.

Please refer to FIG. 10, which is a flowchart schematically illustrating an adjustment method of a signal transmission direction developed according to the present invention for use in a cable configured to be electrically coupled between a first interface port and a second interface port. The method includes steps of: determining whether the communication protocol has changed, e.g. from a first communication protocol to a second communication protocol (Step 901). If positive, an electric characteristic on at least a first pin of the first interface port is detected (Step 902). Then whether the electric characteristic complies with a first condition is determined (Step 903). If positive, a signal transmission direction of at least one pair of differential signal transmission channels in the cable is controlled to change from a first direction to a second direction different from the first direction (Step 904).

Figure 11:
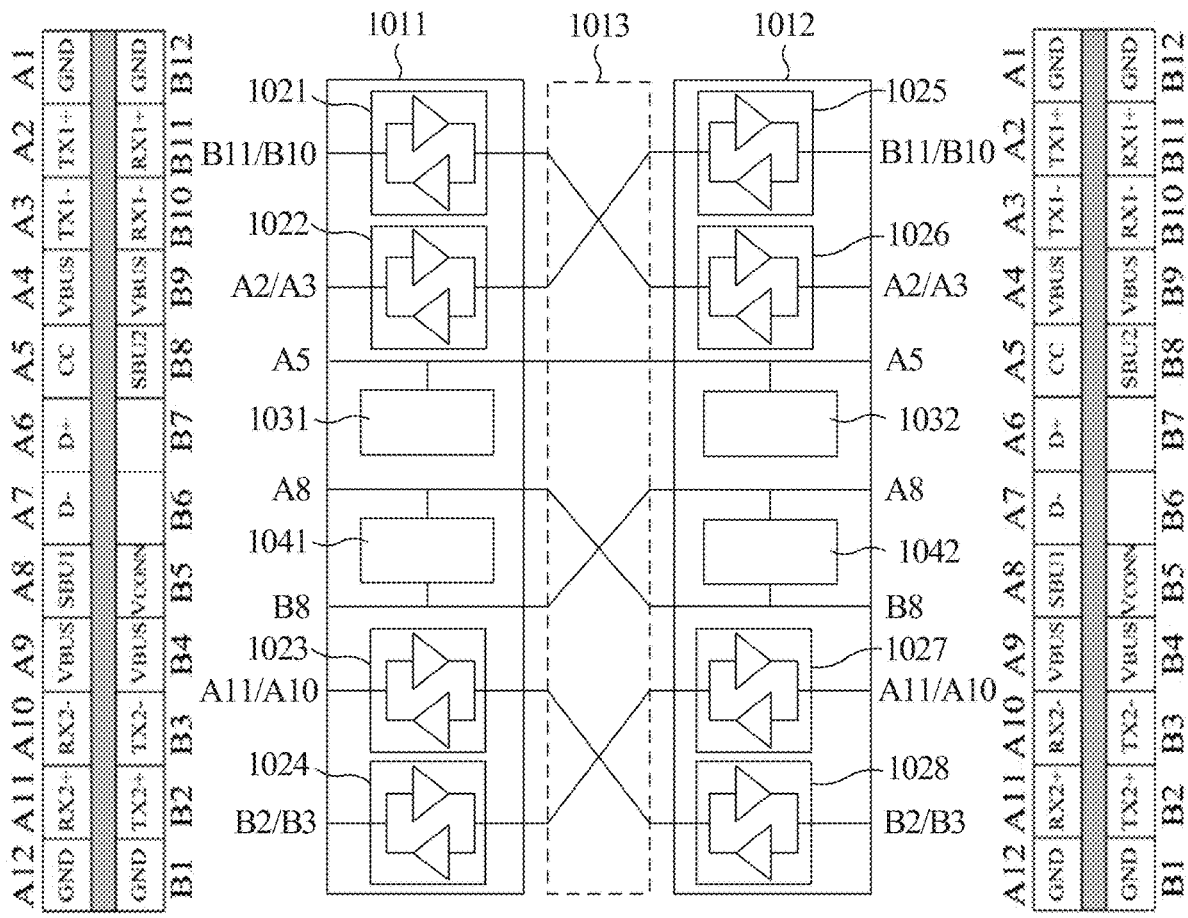
FIG. 11 is a device for adjusting a signal transmission direction according to an embodiment of the present invention.

Taking the USB Type-C architecture as an example, the cable configured to be electrically coupled between the first interface port and the second interface port may be used as the cable configured to be electrically coupled between the first USB Type-C receptacle and the second USB Type-C receptacle. One of a pair of differential signal transmission channels, e.g. B11/B10 shown in FIG. 11, of the USB Type-C cable is coupled to a first bidirectional amplifier, e.g. element 1021 shown in FIG. 11, and a second bidirectional amplifier, e.g. element 1026 shown in FIG. 11, in series, wherein the first bidirectional amplifier is disposed in the cable and located near the first USB Type-C receptacle, and the second bidirectional amplifier is disposed in the cable and located near the second USB Type-C receptacle. Furthermore, the first communication protocol is a USB 3.2 communication protocol, and the second communication protocol may be a DisplayPort communication protocol. The first pin of the first interface port is the pin A8 or the pin B8 of the USB Type-C plug. In one embodiment, the electric characteristic of the first pin is a voltage level of the first pin. When the measured voltage level lies within a preset first voltage range, the first condition is satisfied. Then at least one of the pairs of differential signal transmission channels in the cable is changed from the first direction, e.g. from the device to the host, into the second direction, e.g. from the host to the device. A change of signal transmission direction of the differential signal transmission channels from the first direction to the second direction according to the present invention is executed by changing a state that a first directional amplifier of the first bidirectional amplifier and a first directional amplifier of the second bidirectional amplifier are turned on, while a second directional amplifier of the first bidirectional amplifier and a second directional amplifier of the second bidirectional amplifier are turned off into another state that the first directional amplifier of the first bidirectional amplifier and the first directional amplifier of the second bidirectional amplifier are turned off, while the second directional amplifier of the first bidirectional amplifier and the second directional amplifier of the second bidirectional amplifier are turned on. As shown in FIG. 11, a lower portion of the first bidirectional amplifier 1021 is the first directional amplifier thereof, and an upper portion of the first bidirectional amplifier 1021 is the second directional amplifier thereof. Likewise, a lower portion of the second bidirectional amplifier 1026 is the first directional amplifier thereof, and an upper portion of the second bidirectional amplifier 1026 is the second directional amplifier thereof. Furthermore, as shown in FIG. 11, a plug of the cable disposed at the left side of the drawing is coupled to the host, and another plug of the cable disposed at the right side of the drawing is coupled to the device. In addition to a voltage level, the electric characteristic can be other parameters, e.g. current intensity, capacitance value, and a range associated therewith may also depend on practical requirements.

Further examples are given, wherein voltages on the pin A8 and the pin B8 of the plug are measured. Since the pin A8 of the plug at the host side (DFP_D) is coupled to AUX_CH_P, the voltage measured thereon is supposed to be in the range of 0.024752475V~0.313574661V. Therefore, the range of 0.024752475V~0.313574661V can be used as the preset first voltage range. On the other hand, the pin B8 of the plug at the host side is coupled to AUX_CH_N, so the voltage measured thereon is supposed to be 2.615384615~3.564356436V. Therefore, the range of 2.615384615~3.564356436V may also be used as the preset first voltage range. On the other hand, since the pin A8 of the plug at the device side (UFP_D) must be AUX_CH_N, the voltage measured thereon is supposed to be in the range of 2.615384615~3.564356436V; and since the pin B8 of the plug at the device side must be AUX_CH_P, the voltage measured thereon is supposed to be in the range of 0.024752475V~0.313574661V. Accordingly, the present invention can use the above-described information to determine the type of the component coupled to the plug connector, i.e. either the host or the device, thereby determining a transmission direction of the corresponding signal transmission channels.

Referring again to FIG. 11, functional block diagrams of two bidirectional signal repeater integrated circuit chips 1011 and 1012 and a cable assembly 1013 are schematically shown. The bidirectional signal repeater integrated circuit chips 1011 and 1012 may be respectively wrapped with a connector housing (not shown) at opposite ends of the cable assembly 1013. There are 16 bidirectional signal amplifiers disposed in the bidirectional signal repeater integrated circuit chips 1011 and 1012, i.e. eight for each. The blocks 1021-1028 indicating the bidirectional signal amplifiers, or bidirectional amplifiers, as shown in FIG. 11 are simplified ones for illustration only. The functional block 1021 indicates a bidirectional signal amplifier to which B11/B10 are coupled. As a matter of fact, the channels B11 and B10 are coupled to two respective bidirectional amplifiers in the same electrically connecting way. For simplification, only one functional block is shown in FIG. 11. Similar discussion is applicable to other signal pins such as A2/A3, A11/A10, B2/B3.

In addition, the integrated circuit chips 1011 and 1012 respectively include configuration channel logic units 1031 and 1032 for interpreting USB PD (USB Power Delivery) SOP'/SOP" information associated with power transmission, and taking corresponding actions. Furthermore, the integrated circuit chips 1011 and 1012 include voltage sensors 1041 and 1042, respectively, each of which is configured to be electrically coupled to the pin A8 and pin B8 for sensing the voltage level on the pin. Based on the voltage distribution, the directivity of the bidirectional signal repeater can be determined.

Figure 12:
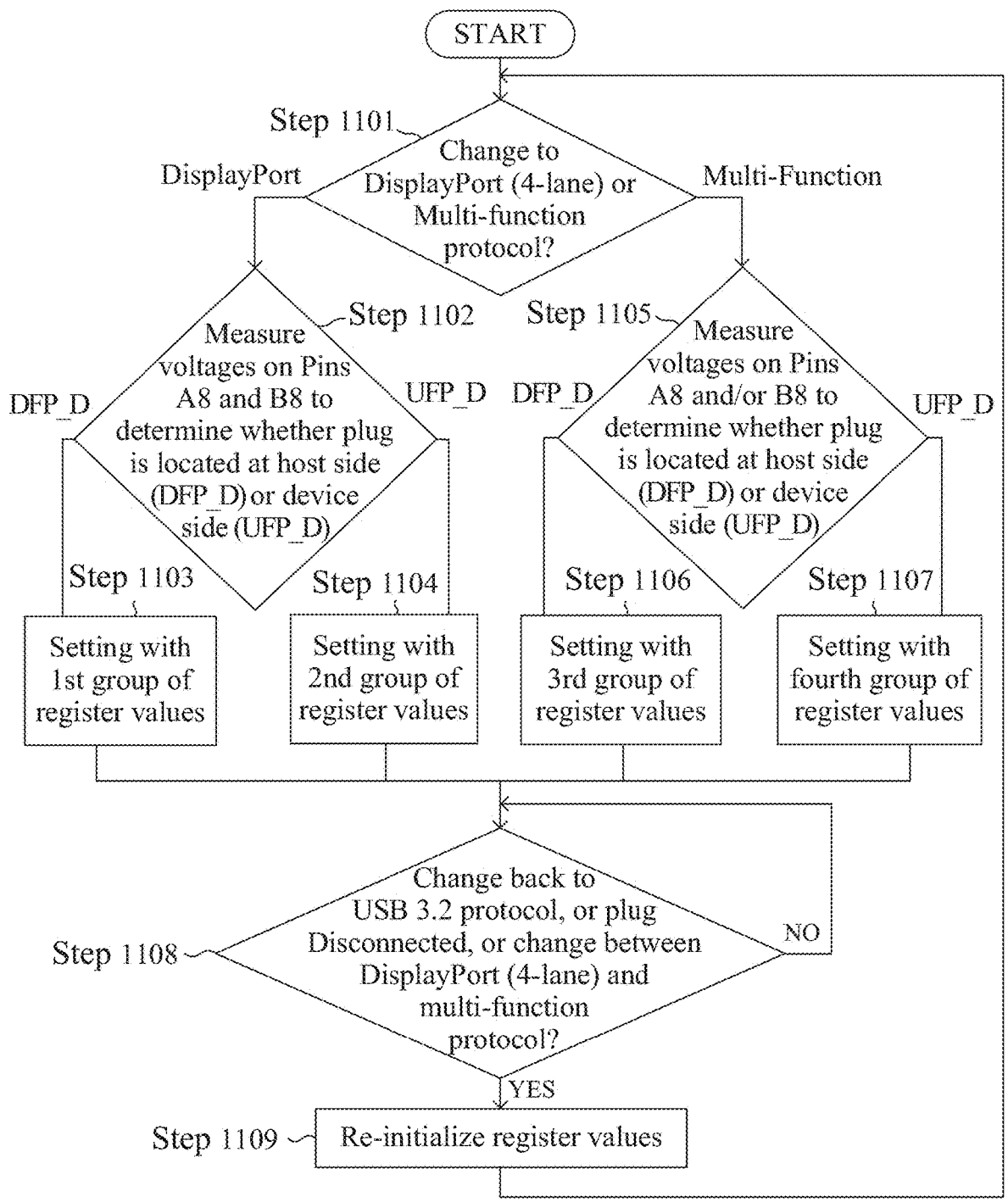
FIG. 12 is a flowchart schematically illustrating a device for adjusting a signal transmission direction according to an embodiment of the present invention.

Referring to FIG. 12, a schematic flowchart of a method for adjusting a signal transmission direction according to the present invention is illustrated. The method can be used in, but is not limited to, the circuit shown in FIG. 11. First, in Step 1101, whether the communication protocol has been changed from a first communication protocol to a second communication protocol is determined. For example, if the communication protocol is determined to have been changed from USB 3.2 to a DisplayPort (4-lane) communication protocol or a multi-function signal transmission communication protocol, from a DisplayPort (4-lane) communication protocol to a multi-function signal transmission communication protocol, or from a multi-function signal transmission protocol to a DisplayPort (4-lane) communication protocol, by the configuration channel logic unit 1031/1032 or a program executing similar functions, the flow proceeds to next stage.

In a case that the communication protocol is changed from USB 3.2 to the DisplayPort (4-lane) communication protocol, Step 1102 is entered to measure voltages on the pin A8 and the pin B8 of the plug, and determine whether the plug is at the host side or the device side according to the measured voltages. If it is determined to be at the host side, a setting operation of a first group of register values is performed (Step 1103), while if it is determined to be at the device side, a setting operation of a second group of register values is performed (Step 1104). Afterwards, a firmware of a microcontroller (not shown) may be revised to use the setting of the first group of register values or the setting of the second group of register values in the register for direction control of the signal transmission channels. Alternatively, the direction control of the signal transmission channels may be conducted by controlling each bidirectional signal amplifier included in bidirectional signal repeater integrated circuit chips via a hardware circuitry design.

In a case that the communication protocol is changed from a USB3.2 communication protocol to a multi-function signal transmission communication protocol, Step 1105 is entered to measure voltages on the pin A8 and the pin B8 of the plug. Step 1105 is entered to measure voltages on the pin A8 and the pin B8 of the plug, and determine whether the plug is at the host side or the device side according to the measured voltages. If it is determined to be at the host side, a setting operation of a third group of register values is performed (Step 1106), while if it is determined to be at the device side, a setting operation of a fourth group of register values is performed (Step 1107).

The execution of Steps 1102 and 1105 for voltage measurement and determination of plug orientation may be performed by using the voltage sensor 1041 in the bidirectional signal repeater integrated circuit chip 1011 only to measure voltages on the pin A8 and the pin B8 of the plug. If the voltage measured on the pin A8 is within the range 0.024752475V~0.313574661V, and the voltage measured on the pin B8 is in the range of 2.615384615V~3.564356436V, it is determined by the bidirectional signal repeater integrated circuit chip 1011 that the plug is at the host side. Meanwhile, the plug at the other side is notified to be at the device side. In contrast, if the voltage measured on the pin A8 is within the range 2.615384615V~3.564356436V, and the voltage measured on the pin B8 is in the range 0.024752475V~0.313574661V, it is determined by the bidirectional signal repeater integrated circuit chip 1011 that the plug is at the device side. Meanwhile, the plug at the other side is notified to be at the host side. Likewise, the execution of Steps 1102 and 1105 for voltage measurement and determination of plug orientation may be performed by using the voltage sensor 1042 in the bidirectional signal repeater integrated circuit chip 1012 only to measure voltages on the pin A8 and the pin B8 of the plug. Alternatively, it is also feasible to use both the voltage sensors 1041 and 1042 of the bidirectional signal repeater integrated circuit chips 1011 and 1012 to identify the locations of the plugs.

As previously mentioned, according to the determination result of step 1102, i.e. at the host side or the device side, the first group of register values or the second group of register values are entered for register setting. For example, when it is determined that a change from USB 3.2 Gen1×2 or Gen2×2 to DisplayPort (4-lane) communication protocol occurs, there will be two lanes required to be subjected to inversion of signal transmission directions. With reference to FIG. 11, in which each of the blocks 1021-1028 is shown in a simplified way and actually involves two bidirectional amplifiers, a two-dimensional coordinate formed with pin numbers of a pair of plugs is used for indicate an orientation of a signal repeater.

When operating under the USB 3.2 protocol, the transmission direction of the signal repeater at a cable plug is (DFP_D.A2, UFP_D.B11) (DFP_D.A3, UFP_D.B10) (UFP_D.A2, DFP_D.B11) (UFP_D.A3, DFP_D.B10) (DFP_D.B2, UFP_D.A11) (DFP_D.B3, UFP_D.A10) (UFP_D.B2, DFP_D.A11) (UFP_D.B3, DFP_D.A10), wherein (DFP_D.A2, UFP_D.B11) indicates that the signal is transmitted from the pin A2 at the host side (DFP_D) to the pin B11 at the device side (UFP_D); (DFP_D.A3, UFP_D.B10) indicates the signal is transmitted from the pin A3 at the host side (DFP_D) to the pin B10 at the device side (UFP_D), (UFP_D.A2, DFP_D.B11) indicate the signal is transmitted from the pin A2 at the device side (UFP_D) to the pin B11 at the host side (DFP_D); and (UFP_D.A3, DFP_D.B10) indicate the signal is transmitted from the pin A3 at the device side (UFP_D) to the pin B10 at the host side (DFP_D). Likewise, (DFP_D.B2, UFP_D.A11) indicates that the signal is transmitted from the pin B2 at the host side (DFP_D) to the pin A11 at the device side (UFP_D); (DFP_D.B3, UFP_D.A10) indicates that the signal is transmitted from the pin B3 at the host side (DFP_D) to the pin A10 at the device side (UFP_D); (UFP_D.B2, DFP_D.A11) indicates the signal is transmitted from the pin B2 at the device side (UFP_D) to the pin A11 at the host side (DFP_D); and (UFP_D.B3, DFP_D.A10) represents that the signal is transmitted from the pin B3 at the device side (UFP_D) to the pin A10 at the host side (DFP_D).

When the protocol is changed to the DisplayPort (4-lane) signal transmission protocol, Step 1102 is executed. If it is determined to be at the host side in Step 1102, the first group of register values are used for setting. The direction of the signal repeater at a cable plug is then set to (DFP_D.A2, UFP_D.B11) (DFP_D.A3, UFP_D.B10) (DFP_D.B11, UFP_D.A2) (DFP_D.B10, UFP_D.A3) (DFP_D.B2, UFP_D.A11) (DFP_D.B3, UFP_D.A10) (DFP_D.A11, UFP_D.B2) (DFP_D.A10, UFP_D.B3). Compared with the original USB 3.2 Gen1×2 or Gen2×2 protocol settings, the original channels (UFP_D.A2, DFP_D.B11), (UFP_D.A3, DFP_D.B10), (UFP_D.B2, DFP_D.A11) and (UFP_D.B3, DFP_D.A10) are inverted into (DFP_D.B11, UFP_D.A2), (DFP_D.B10, UFP_D.A3), (DFP_D.A11, UFP_D.B2) and (DFP_D.A10, UFP_D.B3).

In this embodiment, it is assumed that the left portion of the adjusting device shown in FIG. 11 is coupled to the host, and thus the above register setting can switch a state that the leftward amplifiers included in the bidirectional amplifiers 1026, 1021, 1028, and 1023 are turned on while the rightward amplifiers are turned off into another state that the leftward amplifiers are turned off while the rightward amplifiers are turned on, thereby completing the setting in the DisplayPort (4-lane) signal transmission protocol. This will solve the problems encountered in the prior art by automatically detecting the host side and the device side and automatically configuring the signal line.

When the protocol is changed to the DisplayPort (4-lane) signal transmission protocol, Step 1102 is executed. If it is determined to be at the device side in Step 1102, the second group of register values are used for setting. The direction of the signal repeater at a cable plug is then set to (DFP_D.A2, UFP_D.B11) (DFP_D.A3, UFP_D.B10) (DFP_D.B11, UFP_D.A2) (DFP_D.B10, UFP_D.A3) (DFP_D.B2, UFP_D.A11) (DFP_D.B3, UFP_D.A10) (DFP_D.A11, UFP_D.B2) (DFP_D.A10, UFP_D.B3). Compared with the original USB 3.2 Gen1×2 or Gen2×2 protocol settings, the original channels (UFP_D.A2, DFP_D.B11), (UFP_D.A3, DFP_D.B10), (UFP_D.B2, DFP_D.A11) and (UFP_D.B3, DFP_D.A10) are inverted into (DFP_D.B11, UFP_D.A2), (DFP_D.B10, UFP_D.A3), (DFP_D.A11, UFP_D.B2) and (DFP_D.A10, UFP_D. B3).

In this embodiment, it is assumed that the left portion of the adjusting device shown in FIG. 11 is coupled to the device, and thus the above register setting can switch a state that the rightward amplifiers included in the bidirectional amplifiers 1022, 1025, 1024, and 1027 are turned on while the leftward amplifiers are turned off into another state that the rightward amplifiers are turned off while the leftward amplifiers are turned on, thereby completing the setting in the DisplayPort (4-lane) signal transmission protocol. This will solve the problems encountered in the prior art by automatically detecting the host side and the device side and automatically configuring the signal line.

As previously mentioned, according to the determination result of step 1105, i.e. at the host side or the device side, the third group of register values or the fourth group of register values are entered for register setting. For example, when it is determined that a change from USB 3.2 Gen1×2 or Gen2×2 to a multi-function signal transmission communication protocol occurs, only one lane needs to invert its direction. The original direction of the USB 3.2 Gen1×2 or Gen2×2 signal repeater at a cable plug is (DFP_D.A2, UFP_D.B11) (DFP_D.A3, UFP_D.B10) (UFP_D.A2, DFP_D.B11) (UFP_D.A3, DFP_D.B10) (DFP_D.B2, UFP_D.A11) (DFP_D.B3, UFP_D.A10) (UFP_D.B2, DFP_D.A11) (UFP_D.B3, DFP_D.A10).

When the protocol is changed to the multi-function communication protocol, Step 1105 is executed. If it is determined to be at the host side in Step 1105, the third group of register values are used for setting. The direction of the signal repeater at a cable plug is then set to (DFP_D.A2, UFP_D.B11) (DFP_D.A3, UFP_D.B10) (UFP_D.A2, DFP_D.B11) (UFP_D.A3, DFP_D.B10) (DFP_D.B2, UFP_D.A11) (DFP_D.B3, UFP_D.A10) (DFP_D.A11, UFP_D.B2) (DFP_D.A10, UFP_D.B3). Compared with the original USB 3.2 Gen1×2 or Gen2×2 protocol settings, the original channels (UFP_D.B2, DFP_D.A11) and (UFP_D.B3, DFP_D.A10) are inverted into (DFP_D.A11, UFP_D.B2) and (DFP_D.A10, UFP_D.B3).

In this embodiment, it is assumed that the left portion of the adjusting device shown in FIG. 11 is coupled to the host, and thus the above register setting can switch a state that the leftward amplifiers included in the bidirectional amplifiers 1023 and 1028 are turned on while the rightward amplifiers are turned off into another state that the leftward amplifiers are turned off while the rightward amplifiers are turned on, thereby completing the setting in the multi-function signal transmission protocol. This will solve the problems encountered in the prior art by automatically detecting the host side and the device side and automatically configuring the signal line.

When the protocol is changed to the multi-function communication protocol, Step 1105 is executed. If it is determined to be at the device side in Step 1105, the fourth group of register values are used for setting. The direction of the signal repeater at a cable plug is then set to (DFP_D.A2, UFP_D.B11) (DFP_D.A3, UFP_D.B10) (UFP_D.A2, DFP_D.B11) (UFP_D.A3, DFP_D.B10) (DFP_D.B2, UFP_D.A11) (DFP_D.B3, UFP_D.A10) (DFP_D.A11, UFP_D.B2) (DFP_D.A10, UFP_D.B3). Compared with the original USB 3.2 Gen1×2 or Gen2×2 protocol settings, the original channels (UFP_D.B2, DFP_D.A11) and (UFP_D.B3, DFP_D.A10) are inverted into (DFP_D.A11, UFP_D.B2) and (DFP_D.A10, UFP_D.B3).

In this embodiment, it is assumed that the left portion of the adjusting device shown in FIG. 11 is coupled to the device, and thus the above register setting can switch a state that the rightward amplifiers included in the bidirectional amplifiers 1024 and 1027 are turned on while the leftward amplifiers are turned off into another state that the rightward amplifiers are turned off while the leftward amplifiers are turned on, thereby completing the setting in the multi-function signal transmission protocol. This will solve the problems encountered in the prior art by automatically detecting the host side and the device side and automatically configuring the signal line.

Subsequently, in Step 1108, it is determined whether the communication protocol is changed back to the USB 3.2, whether the plug is disconnected, or whether a change between the DisplayPort (4-lane) signal transmission protocol and the multi-function signal transmission communication protocol occurs. If positive, the flow proceeds to Step 1109 to re-initialize the register values. For example, the register values are reset to the values associated with the setting of the original direction under USB 3.2.

In another embodiment, the active cable may include only one signal repeater, and the adjusting method of the signal transmission direction described above with reference to FIG. 10 and FIG. 12 is still applicable hereto to determine whether the signal repeater is coupled to a host or a device. Then the signal repeater can in turn switch the transmission into the correct direction for each pair of channels. For example, the active cable in FIG. 11 includes only one signal repeater integrated circuit chip 1011, and the signal repeater integrated circuit chip 1011 is still able to perform the adjustment of the signal transmission direction as described above with reference to FIG. 10.

Taking the USB Type-C architecture as an example, the cable configured to be electrically coupled between the first interface port and the second interface port may be used as the cable configured to be electrically coupled between the first USB Type-C receptacle and the second USB Type-C receptacle. One of a pair of differential signal transmission channels, e.g. B11/B10 shown in FIG. 11, of the USB Type-C cable is coupled to a first bidirectional amplifier, e.g. element 1021 shown in FIG. 11, wherein the first bidirectional amplifier is disposed in the cable and located near the first USB Type-C receptacle. Furthermore, the first communication protocol is a USB 3.2 communication protocol, and the second communication protocol may be a DisplayPort communication protocol. The first pin of the first interface port is the pin A8 or the pin B8 of the USB Type-C plug. In one embodiment, the electric characteristic of the first pin is a voltage level of the first pin. When the measured voltage level lies within a preset first voltage range, the first condition is satisfied. Then the pair of differential signal transmission channels are changed from the first direction, e.g. from the device to the host, into the second direction, e.g. from the host to the device. A change of signal transmission direction of the differential signal transmission channels from the first direction to the second direction according to the present invention is executed by changing a state that a first directional amplifier of the first bidirectional amplifier is turned on while a second directional amplifier of the first bidirectional amplifier is turned off into another state that the first directional amplifier of the first bidirectional amplifier is turned off while the second directional amplifier of the first bidirectional amplifier is turned on. As shown in FIG. 11, a lower portion of the first bidirectional amplifier 1021 is the first directional amplifier thereof, and an upper portion of the first bidirectional amplifier 1021 is the second directional amplifier thereof. Furthermore, as shown in FIG. 11, a plug of the cable disposed at the left side of the drawing is coupled to the host, and another plug of the cable disposed at the right side of the drawing is connected to the device. In addition to a voltage level, the electric characteristic can be other parameters, e.g. current intensity, capacitance value, and a range associated therewith may also depend on practical requirements.

Therefore, the active cable according to the present invention, in spite including at least one signal repeater, can be coupled to the host and the device in arbitrary directions.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for adjusting a signal transmission direction, comprising:
   providing a cable, which has a first connector and a second connector disposed at opposite ends thereof and a first adjusting device disposed in the first connector;
   detachably connecting the first connector and the second connector to a first interface port and a second interface port, respectively;
   the first adjusting device detecting an electric characteristic on at least a first pin of the first interface port connected to the first connector; and
   controlling a signal transmission direction of at least one pair of differential signal transmission channels in the cable to change from a first direction to a reverse second direction, provided that a communication protocol between the first interface port and the second interface port is changed from a first communication protocol to a second communication protocol, and the electric characteristic complies with a first condition;
   wherein the at least one pair of differential signal transmission channels in the cable are coupled to a first bidirectional amplifier in series respectively, which is disposed in the cable near the first interface port, and the pair of differential signal transmission channels are controlled to change from the first direction to the second direction by changing a state that a first directional amplifier of the first bidirectional amplifier is turned on while a second directional amplifier of the first bidirectional amplifier is turned off into another state that the first directional amplifier of the first bidirectional amplifier is turned off while the second directional amplifier of the first bidirectional amplifier is turned on.

2. The method according to claim 1, wherein the first communication protocol is USB 3.2 communication protocol, and the second communication protocol is a DisplayPort communication protocol, and the first pin of the first interface port is a pin A8 or B8 defined in USB-Type C standard, wherein the electric characteristic is a voltage level, and wherein the first condition is complied with when the measured voltage is within a preset first range.

3. The method according to claim 2, wherein the DisplayPort communication protocol is a multi-function communication protocol or a DisplayPort (4-lane) communication protocol.

4. The method according to claim 1, further comprising:
   disposing a second adjusting device in the second connector;
   the second adjusting device detecting an electric characteristic on at least a second pin of the second interface port; and
   controlling a signal transmission direction of at least one pair of differential signal transmission channels in the cable to change from a first direction to a reverse second direction different from the first direction, provided that a communication protocol between the first interface port and the second interface port is changed from the first communication protocol to the second communication protocol, and the electric characteristic complies with a second condition.

5. The method according to claim 4, wherein the pair of differential signal transmission channels in the cable are coupled to a first bidirectional amplifier and a second bidirectional amplifier in series, respectively, and the pair of differential signal transmission channels are controlled to change from the first direction to the second direction by changing a state that a first directional amplifier of the first bidirectional amplifier and a first directional amplifier of the second bidirectional amplifier are turned on, while a second directional amplifier of the first bidirectional amplifier and a second directional amplifier of the second bidirectional amplifier are turned off into another state that the first directional amplifier of the first bidirectional amplifier and the first directional amplifier of the second bidirectional amplifier are turned off, while the second directional amplifier of the first bidirectional amplifier and the second directional amplifier of the second bidirectional amplifier are turned on;
   wherein the first bidirectional amplifier is disposed in the cable and near the first interface port, and the second bidirectional amplifier is disposed in the cable and near the second interface port.

6. A cable configured to be electrically coupled between a first interface port and a second interface port, comprising:
   a first connector disposed at a first end to be detachably connected to a first interface port;
   a second connector disposed at a second end opposite to the first end to be detachably connected to a second interface port;
   a first bidirectional amplifier disposed in the first connector, and electrically coupled to a first pin of the first interface port when the first connector is connected to the first interface port; and
   a first sensor disposed in the first connector, and electrically coupled to a second pin of the first interface port when the first connector is connected to the first interface port,
   wherein a signal transmission direction of the first bidirectional amplifier is changed from a first direction to a reverse second direction, provided that a communication protocol between the first interface port and the second interface port interconnected via the cable is changed from a first communication protocol to a second communication protocol, and a first electric characteristic detected by the first sensor on the second pin complies with a first condition; and
   wherein the signal transmission direction of the first bidirectional amplifier is controlled by changing a state that a first directional amplifier of the first bidirectional amplifier is turned on while a second directional amplifier of the first bidirectional amplifier is turned off into another state that the first directional amplifier of the first bidirectional amplifier is turned off while the first second amplifier of the first bidirectional amplifier is turned on.

7. The cable according to claim 6, wherein the cable is a USB Type-C cable, the first interface port is a first USB Type-C receptacle, the second interface port is a second USB Type-C receptacle, the first sensor is a first voltage sensor, the first electric characteristic is a first voltage value, and the first bidirectional amplifier and the first voltage sensor are integrated in a first bidirectional signal repeater IC chip, which is disposed in a housing of a first plug of the cable near the first USB Type-C receptacle.

8. The cable according to claim 7, wherein the second pin of the first USB Type-C receptacle is a pin A8 or B8 defined in USB-Type C standard, and a signal transmission direction of the first bidirectional amplifier is changed from the first direction to the reverse second direction, provided that a communication protocol between the first interface port and the second interface port is changed from a USB 3.2 communication protocol to a DisplayPort communication protocol, and a voltage range measured on the second pin by the first voltage sensor complies with the first condition.

9. The cable according to claim 6, further comprising:
a second bidirectional amplifier disposed in the second connector, and electrically coupled to a third pin of the second interface port and the first bidirectional amplifier when the second connector is connected to the second interface port; and
a second sensor disposed in the second connector, and electrically coupled to a fourth pin of the second interface port when the second connector is connected to the second interface port,
wherein a signal transmission direction of the second bidirectional amplifier is changed provided that a second electric characteristic detected by the second sensor on the fourth pin complies with a second condition.

10. The cable according to claim 9, wherein the cable is a USB Type-C cable, the first interface port is a first USB Type-C receptacle, the second interface port is a second USB Type-C receptacle, the first sensor is a first voltage sensor, the second sensor is a second voltage sensor, the first electric characteristic is a first voltage value, the second electric characteristic is a second voltage value, the first bidirectional amplifier and the first voltage sensor are integrated in a first bidirectional signal repeater IC chip, which is disposed in a housing of a first plug of the cable near the first USB Type-C receptacle, and the second bidirectional amplifier and the second voltage sensor are integrated in a second bidirectional signal repeater IC chip, which is disposed in a housing of a second plug of the cable near the second USB Type-C receptacle.

11. The cable according to claim 10, wherein the fourth pin of the second USB Type-C receptacle is a pin A8 or B8 defined in USB-Type C standard, and a signal transmission direction of the second bidirectional amplifier is changed from the first direction to the reverse second direction, provided that a communication protocol between the first interface port and the second interface port is changed from a USB 3.2 communication protocol to a DisplayPort communication protocol, and a voltage range measured on the fourth pin by the second voltage sensor complies with the second condition.

12. The cable according to claim 9, wherein the signal transmission direction of the first bidirectional amplifier and the signal transmission direction of the second bidirectional amplifier are controlled by changing a state that a first directional amplifier of the first bidirectional amplifier and a first directional amplifier of the second bidirectional amplifier are turned on, while a second directional amplifier of the first bidirectional amplifier and a second directional amplifier of the second bidirectional amplifier are turned off into another state that the first directional amplifier of the first bidirectional amplifier and the first directional amplifier of the second bidirectional amplifier are turned off, while the second directional amplifier of the first bidirectional amplifier and the second directional amplifier of the second bidirectional amplifier are turned on.

13. A bidirectional ReDriver IC chip, adapted to be disposed in a cable, which has a first connector detachably connected to a first interface port and a second detachably connector connected to a second interface port, and comprising:
a bidirectional amplifier electrically coupled to a first pin of the first interface port when the first connector is connected to the first interface port; and
a sensor electrically coupled to a second pin of the first interface port when the second connector is connected to the second interface port,
wherein a signal transmission direction of the bidirectional amplifier is changed from a first direction to a reverse second direction, provided that a communication protocol between the first interface port and the second interface port interconnected via the cable is changed from a first communication protocol to a reverse second communication protocol, and an electric characteristic detected by the sensor on the second pin complies with a first condition; and
wherein the signal transmission direction of the bidirectional amplifier is controlled by changing a state that a first directional amplifier of the bidirectional amplifier is turned on while a second directional amplifier of the bidirectional amplifier is turned off into another state that the first directional amplifier of the bidirectional amplifier is turned off while the first second amplifier of the bidirectional amplifier is turned on.

14. The bidirectional ReDriver IC chip according to claim 13, wherein the cable is a USB Type-C cable, the first interface port is a first USB Type-C receptacle, the second interface port is a second USB Type-C receptacle, the sensor is a voltage sensor, the electric characteristic is a voltage value, and the bidirectional ReDriver IC chip is disposed in a housing of a first plug of the cable near the first USB Type-C receptacle.

15. The bidirectional ReDriver IC chip according to claim 14, wherein the second pin of the first USB Type-C receptacle is a pin A8 or B8 defined in USB-Type C standard, and a signal transmission direction of the first bidirectional amplifier is changed from the first direction to the second direction different from the first direction, provided that a communication protocol between the first interface port and the second interface port is changed from a USB 3.2 communication protocol to a DisplayPort communication protocol, and a voltage range measured on the second pin by the voltage sensor complies with the first condition.

* * * * *